United States Patent
Park et al.

(10) Patent No.: US 11,621,440 B2
(45) Date of Patent: Apr. 4, 2023

(54) COMPOSITION FOR FORMING INSULATING LAYER FOR LITHIUM SECONDARY BATTERY AND METHOD OF PREPARING ELECTRODE FOR LITHIUM SECONDARY BATTERY USING THE SAME

(71) Applicant: LG Chem, Ltd., Seoul (KR)

(72) Inventors: Sung Chul Park, Daejeon (KR); Ung Ju Lee, Daejeon (KR); Koo Seung Chung, Daejeon (KR); Won Hee Jeong, Daejeon (KR); Jung Woo Yoo, Daejeon (KR); Young Jae Kim, Daejeon (KR)

(73) Assignee: LG Energy Solution, Ltd.

( * ) Notice: Subject to any disclaimer, the term of this patent is extended or adjusted under 35 U.S.C. 154(b) by 423 days.

(21) Appl. No.: 16/963,045

(22) PCT Filed: Feb. 1, 2019

(86) PCT No.: PCT/KR2019/001461
§ 371 (c)(1),
(2) Date: Aug. 14, 2020

(87) PCT Pub. No.: WO2019/151831
PCT Pub. Date: Aug. 8, 2019

(65) Prior Publication Data
US 2020/0388850 A1    Dec. 10, 2020

(30) Foreign Application Priority Data

Feb. 1, 2018    (KR) .................. 10-2018-0013009

(51) Int. Cl.
*H01M 10/42*    (2006.01)
*H01M 4/62*    (2006.01)
(Continued)

(52) U.S. Cl.
CPC .......... *H01M 10/4235* (2013.01); *H01B 3/18* (2013.01); *H01M 4/04* (2013.01);
(Continued)

(58) Field of Classification Search
None
See application file for complete search history.

(56) References Cited

U.S. PATENT DOCUMENTS

2004/0058250 A1    3/2004    Kim et al.
2004/0202928 A1    10/2004    Miyamoto et al.
(Continued)

FOREIGN PATENT DOCUMENTS

CN    102487137 A    6/2012
EP    3723166 A1    10/2020
(Continued)

OTHER PUBLICATIONS

International Search Report for Application No. PCT/KR2019/001461 dated May 16, 2019, 2 pages.
(Continued)

*Primary Examiner* — Robert S Carrico
(74) *Attorney, Agent, or Firm* — Lerner, David, Littenberg, Krumholz & Mentlik, LLP

(57) ABSTRACT

The present invention provides a composition for forming an insulating layer for a lithium secondary battery, which includes a binder polymer; a coloring agent including at least one selected from the group consisting of an organic dye, an oil-soluble dye and an organic phosphor; and a solvent, and has a viscosity of 1,000 cP or more at 25° C.

14 Claims, 10 Drawing Sheets

(51) Int. Cl.

| | | |
|---|---|---|
| *H01B 3/18* | (2006.01) | |
| *H01M 4/04* | (2006.01) | |
| *H01M 4/13* | (2010.01) | |
| *H01M 4/139* | (2010.01) | |
| *H01M 10/052* | (2010.01) | |

(52) U.S. Cl.
CPC ............ *H01M 4/13* (2013.01); *H01M 4/139* (2013.01); *H01M 4/62* (2013.01); *H01M 4/622* (2013.01); *H01M 10/052* (2013.01)

(56) References Cited

U.S. PATENT DOCUMENTS

| | | |
|---|---|---|
| 2006/0199294 A1 | 9/2006 | Fujikawa et al. |
| 2011/0159360 A1 | 6/2011 | Hirota et al. |
| 2012/0141877 A1 | 6/2012 | Choi et al. |
| 2013/0252089 A1 | 9/2013 | Kuriki |
| 2015/0079460 A1 | 3/2015 | Byun et al. |
| 2015/0243964 A1 | 8/2015 | Yu et al. |
| 2017/0033327 A1 | 2/2017 | Tajima |
| 2018/0159136 A1 | 6/2018 | Shiozaki et al. |
| 2018/0212277 A1 | 7/2018 | Park et al. |
| 2020/0373558 A1 | 11/2020 | Park et al. |
| 2021/0376333 A1 | 12/2021 | Shiozaki et al. |

FOREIGN PATENT DOCUMENTS

| | | |
|---|---|---|
| JP | H09082290 A | 3/1997 |
| JP | 2004259625 A | 9/2004 |
| JP | 2009289718 A | 12/2009 |
| JP | 2012025633 A | 2/2012 |
| JP | 2013198891 A | 10/2013 |
| JP | 2015101615 A | 6/2015 |
| JP | 2016514891 A | 5/2016 |
| JP | 2016178337 A | 10/2016 |
| JP | 2017033820 A | 2/2017 |
| JP | 2017062960 A | 3/2017 |
| KR | 100772305 B1 | 11/2007 |
| KR | 20120062333 A | 6/2012 |
| KR | 20130107241 A | 10/2013 |
| KR | 20140015647 A | 2/2014 |
| KR | 20140132618 A | 11/2014 |
| KR | 20150031724 A | 3/2015 |
| KR | 20160125720 A | 11/2016 |
| WO | 2013110182 A1 | 8/2013 |
| WO | 2013157624 A1 | 10/2013 |
| WO | 2017038010 A1 | 3/2017 |
| WO | 2017146357 A1 | 8/2017 |

OTHER PUBLICATIONS

European Search Report for Application No. EP19748335.7, dated Dec. 8, 2020, 7 pages.
Search Report dated Sep. 28, 2022 from the Office Action for Chinese Application No. 201980007556.4 dated Oct. 9, 2022, 3 pages.

COMPOSITION FOR FORMING INSULATING LAYER FOR LITHIUM SECONDARY BATTERY AND METHOD OF PREPARING ELECTRODE FOR LITHIUM SECONDARY BATTERY USING THE SAME

CROSS-REFERENCE TO RELATED APPLICATIONS

This present application is a national phase entry under 35 U.S.C. § 371 of International Patent Application No. PCT/KR2019/001461, filed on Feb. 1, 2019, published in Korean, which claims priority from Korean Patent Application No. 10-2018-0013009, filed on Feb. 1, 2018, the disclosures of which are hereby incorporated herein by reference in their entireties.

TECHNICAL FIELD

The present invention relates to a composition for forming an insulating layer for a lithium secondary battery and a method of preparing an electrode for a lithium secondary battery using the same.

BACKGROUND ART

According to the increase in the development and demand for mobile devices, the demand for a secondary battery as a power source is rapidly increasing, and therefore many studies on batteries capable of meeting various demands have been conducted.

Typically, in terms of the shape of a battery, there is a high demand for a prismatic battery and a pouch-type battery, which can be applied to a product such as a mobile phone with a small thickness, and in terms of a material, there is a high demand for a lithium secondary battery such as a lithium cobalt polymer battery with a high energy density, a high discharge voltage and high safety.

One of the major research projects on secondary batteries is enhancing safety. The main cause of battery safety-related accidents is caused by occurrence of an abnormal high temperature state due to a short circuit between a positive electrode and a negative electrode. In other words, to maintain electric insulation in a normal situation, a separator is disposed between the positive electrode and the negative electrode, but there is a limitation with only a conventional separator in an abnormal abuse situation in which a battery is overcharged or overdischarged, an internal short circuit occurs due to the dendritic growth of an electrode material or impurities, a sharp object such as a nail or a screw perforates a battery, or the battery is deformed excessively due to an external force.

Generally, a microporous film consisting of a polyolefin resin is mainly used as a separator, but the film has a thermal resistance temperature of about 120 to 160° C., which means that the film has insufficient thermal resistance. Therefore, when an internal short circuit occurs, there is a problem in which a short-circuit part expands by shrinkage of the separator due to short-circuit reaction heat, leading to thermal runaway in which more and higher reaction heat is generated.

In addition, generally, a secondary battery is produced in a prismatic shape by cutting a positive electrode and a negative electrode into a constant size, and overlapping the cut electrodes layer by layer. Here, as there is a very small needle-like sharp part at the edge of the positive electrode or negative electrode coated with a polymer electrolyte, when the electrodes are stacked, this part has a minute internal short circuit, leading to an adverse effect on battery performance. Particularly, since the edge is more irregular than the inside when being coated with a polymer electrolyte, there is a high probability of a short circuit due to non-uniform coating. In addition, when upper and lower electrode layers are slightly mismatched while the electrodes are stacked, a short circuit between the positive electrode and the negative electrode may occur.

As described above, various methods for reducing cell deformation, an external impact or the probability of a physical short circuit between a positive electrode and a negative electrode have been studied.

For example, to prevent a short circuit in a completed battery caused by the contact of an electrode tab with the upper portion of an electrode assembly due to movement of the electrode assembly, a method of attaching an insulation tape with a predetermined size to an electrode tab adjacent to the upper portion of a current collector is used. As the insulation tape, a polyimide film is generally used, and it is generally recommended that winding of the insulation tape progresses from the upper portion of the current collector to a length slightly extending downward. In addition, to prevent unwinding, generally, the tape was wound about 2 to 3 times.

However, winding of the insulation tape is very complicated, and when the insulation tape is wound from the upper portion of the current collector to a length slightly extending downward, such a portion may cause an increase in thickness of the electrode assembly. Further, there is a problem that the tape tends to be unwound when the electrode tap is bent.

Korean Unexamined Patent Application Publication No. 10-2015-0031724 discloses a secondary battery.

Prior Art Literature

Patent Literature

Korean Unexamined Patent Application Publication No. 10-2015-0031724

DISCLOSURE

Technical Problem

The present invention is directed to providing a composition for forming an insulating layer for a lithium secondary battery in which a formation and alignment position of an insulating layer can be easily determined in the formation of the insulating layer, and the erosion of an active material layer in the part overlapping an electrode active material layer can be inhibited.

The present invention is also directed to providing a method of preparing an electrode for a lithium secondary battery using the above-described composition for forming an insulating layer for a lithium secondary battery.

The present invention is also directed to providing an electrode for a lithium secondary battery including an insulating layer formed of the above-described composition for forming an insulating layer for a lithium secondary battery.

The present invention is also directed to providing a lithium secondary battery including the above-described electrode for a lithium secondary battery.

Technical Solution

The present invention provides a composition for forming an insulating layer for a lithium secondary battery, the composition including a binder polymer; a coloring agent including at least one selected from the group consisting of: an organic dye, an oil-soluble dye and an organic phosphor; and a solvent. The composition has a viscosity of 1,000 cP or more at 25° C.

In addition, the present invention provides a method of preparing an electrode for a lithium secondary battery, which includes forming an undried electrode active material layer by applying an active material slurry composition on an electrode current collector; forming an undried insulating layer by applying the above-described composition to the electrode current collector overlapping the undried electrode active material layer in a region of the electrode current collector; and simultaneously drying the undried electrode active material layer and the undried insulating layer.

In addition, the present invention provides an electrode for the lithium secondary battery, the electrode including an electrode current collector; an electrode active material layer formed on the electrode current collector; and an insulating layer formed on the electrode current collector and overlapping the electrode active material layer in a region of the electrode current collector, wherein a thickness of the insulating layer in the region of the electrode current collector is continually decreased in a direction extending from an outer peripheral edge of the electrode active material layer towards an inner peripheral edge of the insulating layer, and the insulating layer is formed of the above-described composition for forming an insulating layer for a lithium secondary battery.

In addition, the present invention provides a lithium secondary battery including the above-described electrode.

Advantageous Effects

By using a coloring agent such as an organic dye, a composition for forming an insulating layer for a lithium secondary battery according to the present invention can exhibit liquid stability, and an alignment position of the insulating layer can be easily determined in the formation of an insulating layer.

In addition, in the composition for forming an insulating layer for a lithium secondary battery according to the present invention, the coloring agent can be easily dissolved without using a dispersing agent, and accordingly the viscosity of the composition can be easily adjusted. As a result, the insulating layer formed thereby can have an excellent adhesive strength in the overlapping region with an electrode active material layer and inhibit erosion.

Therefore, with an electrode for a lithium secondary battery prepared using the composition for forming an insulating layer and a lithium secondary battery including the same, it is possible to easily evaluate battery quality due to easiness of the detection of an insulating layer formation position, and ensure the quality and stability of a product.

MODES OF THE INVENTION

Figure 1:
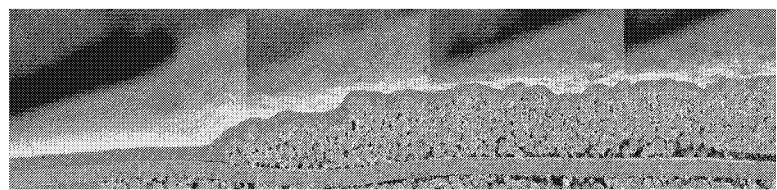
FIG. 1 is a scanning electron microscope (SEM) image showing the overlapping region of an insulating layer and a positive electrode active material layer in the cross-section of a positive electrode prepared in Example 1.

Hereinafter, the present invention will be described in further detail to help understanding of the present invention. Here, terms and words used in the specification and claims should not be construed as limited to general or dictionary meanings, and should be interpreted with the meaning and concept in accordance with the technical idea of the present invention based on the principle that the inventors have appropriately defined the concepts of terms in order to explain the invention in the best way.

The terms used in the specification are used only to explain specific examples, not to limit the present invention. Singular expressions include plural referents unless clearly indicated otherwise in the context.

The terms "include" and "have" used herein designate the presence of characteristics, numbers, stages, components or a combination thereof, and it should be understood that the possibility of the presence or addition of one or more other characteristics, numbers, stages, components, or a combination thereof is not excluded in advance.

The "%" used herein means a weight percent (wt %) unless explicitly indicated otherwise.

In the specification, the average particle size ($D_{50}$) may be defined as a particle size corresponding to 50% in a cumulative volume-based particle size distribution curve. The average particle size ($D_{50}$) may be measured using a laser diffraction method. The laser diffraction method generally enables measurement of a particle size in a range from submicrons to several mm, and may obtain a result with high reproducibility and high resolution.

Hereinafter, the present invention will be described in detail.

Composition for Forming Insulating Layer

A composition for forming an insulating layer of the present invention includes (1) a binder polymer, (2) a coloring agent including at least one selected from the group consisting of an organic dye, an oil-soluble dye and an organic phosphor, and (3) a solvent, and has a viscosity of 1,000 cP or more at 25° C.

For example, the insulating layer may be formed on the uncoated part of an electrode current collector, which is not coated with an electrode active material layer, or formed to partially overlap an electrode active material layer. Here, generally, to determine where the insulating layer is applied, the composition for forming an insulating layer may be mixed with a pigment. However, generally, a pigment such as an inorganic pigment or an organic pigment is insoluble in water or an organic solvent and easily coagulated in a composition, such that it is difficult to be uniformly distributed in the insulating layer. To prevent the coagulation of the pigment, a dispersing agent may be added to the composition for forming an insulating layer. However, to perform a process of overlapping the electrode active material layer and the insulating layer, the composition for forming an insulating layer requires a certain level or more of viscosity, and the composition having a viscosity satisfying such a requirement may have problems of difficulty in pigment dispersion and the possibility of coagulation despite the addition of a dispersing agent.

However, since the composition for forming an insulating layer for a lithium secondary battery of the present invention uses an organic dye having excellent solubility and dispersity even at a high level of viscosity as a coloring agent, a separate dispersing agent is not needed, and excellent coatability is exhibited.

In addition, the composition for forming an insulating layer for a lithium secondary battery of the present invention may have excellent liquid stability using an organic dye as a coloring agent, and it is easy to determine an alignment position of an insulating layer in the formation of an insulating layer.

In addition, the composition for forming an insulating layer for a lithium secondary battery according to the prevent invention may easily dissolve a color agent without using a dispersing agent, thereby easily controlling the viscosity of the composition, and therefore the insulating layer may have excellent adhesive strength in an overlapping region with an electrode active material layer, and the erosion of the insulating layer may be inhibited.

Therefore, with an electrode for a lithium secondary battery prepared using the composition for forming an insulating layer and a lithium secondary battery including the same, it is possible to easily detect an insulating layer formation position to facilitate quality evaluation, and ensure product quality and stability.

The binder polymer is a component for imparting a binding ability to an electrode current collector and/or an electrode active material layer, for example, when an insulating layer is formed of the composition for forming an insulating layer.

The binder polymer may be at least one binder polymer selected from the group consisting of polyvinylidene fluoride, polyvinyl alcohol, styrene butadiene rubber, polyethylene oxide, carboxyl methyl cellulose, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, polymethylmethacrylate, polybutylacrylate, polyacrylonitrile, polyvinylpyrrolidone, polyvinylacetate, polyethylene-co-vinyl acetate, polyarylate and a low molecular weight compound having a molecular weight of 10,000 g/mol or less. Among these, the binder polymer may be polyvinylidene fluoride in terms of an adhesiveness, chemical resistance and electrochemical stability.

The polyvinylidene fluoride polymer may have a weight average molecular weight of 400,000 to 1,500,000, and preferably 600,000 to 1,200,000 in terms of enhancing adhesive strength to the above described electrode active material layer and achieving a desired viscosity.

The polyvinylidene fluoride polymer may have a melting point of 150 to 180° C., and preferably 165 to 175° C. in terms of enhancing the solubility of the composition.

As the binder polymer, a material used as a binder in an electrode active material layer to be described below, that is, a material which is the same as the binder for an electrode active material layer is preferably used. In this case, the adhesive strength or cohesive strength between the insulating layer and the electrode active material layer may be further enhanced.

The binder polymer may be included at 5 to 15 parts by weight, preferably 7 to 12 parts by weight, and more preferably 7.5 to 10 parts by weight with respect to 100 parts by weight of the solvent in terms of realizing a desired viscosity characteristic and easily forming the insulating layer.

The coloring agent may be added in the composition to determine an insulating layer formation position when the insulating layer is coated using the composition for forming an insulating layer for a lithium secondary battery using a detector.

The coloring agent includes an organic dye, an oil-soluble dye and/or an organic phosphor. Since the coloring agent according to the present invention including the organic dye, oil-soluble dye and/or organic phosphor has an excellent solubility in a solvent, when used, the dye or phosphors may be uniformly distributed in an insulating layer. The composition for forming an insulating layer, compared with that using a pigment as a coloring agent, may be significantly reduced in coagulation of the coloring agent, and phase separation, a decrease in liquid stability, and erosion in the overlapping region of the electrode active material layer and the insulating layer when a dispersing agent is used to prevent the coagulation of the pigment may be considerably decreased.

The organic dye may be at least one selected from the group consisting of an anthraquinone-based dye, an anilino azo-based dye, a triphenylmethane-based dye, a pyrazole azo-based dye, a pyridone azo-based dye, an atrapyridone-based dye, an oxonol-based dye, a benzylidene dye, and a xanthene dye, preferably, at least one selected from the group consisting of a benzylidene dye and an azo-based dye, and more preferably, a benzylidene dye so as to enhance liquid stability and an effect of preventing phase separation.

As the organic phosphor, for example, an organic phosphor having a carboxyl group, a phosphate group or both may be used.

The oil-soluble dye may be a benzimidazolone-based compound, an azo-based compound, a quinophthalone-based compound, a quinacridone-based compound, a phtalocyanine-based compound, a diketo-pyrrolo-pyrrole (DPP)-based compound or a combination of two or more thereof, and preferably, a benzimidazolone-based compound, an azo-based compound or a combination of two or more thereof so as to enhance a recognition property.

The coloring agent may further include a metal ion in addition to the organic dye, the oil-soluble dye and/or the organic phosphor. Specifically, the coloring agent may include an organic dye, an oil-soluble dye and/or an organic phosphor, which form(s) a complex salt structure with a metal ion. Since the organic dye, the oil-soluble dye and/or the organic phosphor form(s) a complex salt structure with the metal ion, excellent solubility or dispersibility in an organic solvent and excellent light resistance and stability and thermal resistance may be exhibited, clearness may be further enhanced, and uniform distribution in the composition may be realized.

The metal ion is not particularly limited as long as it can form a complex salt structure with the above-described organic dye, the oil-soluble dye and/or the organic phosphor, and may include, for example, copper, cobalt, chromium, nickel and/or iron ion(s), and preferably a chromium ion.

The solubility of the coloring agent in the solvent may be 300 to 500 g/L, and preferably 350 to 450 g/L at 25° C., and the above-mentioned range is preferable in terms of uniform distribution and enhanced solubility of the coloring agent.

The coloring agent may be included at 0.01 to 10 parts by weight, preferably 0.01 to 5 parts by weight, and more preferably 0.01 to 0.3 part by weight, with respect to 100 parts by weight of the solvent, and the above-mentioned range is preferable in terms of ensuring visibility when an insulating layer formation position is confirmed using a detector and uniform distribution in the insulating layer.

The solvent may include methylpyrrolidone (NMP) in terms of realizing the solubility of the above-described solubility and a viscosity range to be described below.

The solid content of the composition for forming an insulating layer for a lithium secondary battery may be 5 to 15 wt %, preferably 8 to 12 wt %, and more preferably 8.5 to 10 wt %. The above-mentioned range is preferable in terms of ensuring desired coatability and a viscosity range.

The viscosity of the composition for forming an insulating layer may be 1,000 cP or more at 25° C., and the high viscosity is preferable in terms of realizing a desired cohesive property when the overlapping region of the electrode active material layer and the insulating layer is realized, and preventing the erosion of the electrode active material layer. When the viscosity of the composition is less than 1,000 cP at 25° C., liquid stability may be significantly deteriorated, and the erosion in the overlapping region may occur.

The composition for forming an insulating layer for a lithium secondary battery preferably has a viscosity of 1,000 to 10,000 cP, and more preferably 5,000 to 8,000 cP at 25° C., and when the viscosity is within the above-mentioned range, a cohesive property and an effect of preventing the erosion of an electrode active material layer in the overlapping region may be further enhanced, and excellent coatability may be realized.

Since the above-described composition for forming an insulating layer for a lithium secondary battery has a viscosity in the above-mentioned range, an excellent cohesive strength of the electrode active material layer and the excellent effect of preventing the erosion of an electrode active material layer in the overlapping region may be realized. In addition, since an organic material having excellent solubility in a solvent is used as a coloring agent, it is possible to uniformly distribute the coloring agent, and to realize a high viscosity range because a dispersing agent is not used. In addition, excellent cohesive strength to an electrode current collector or electrode active material layer may be exhibited, and an alignment position of the insulating layer may be easily determined and monitored.

Electrode for Secondary Battery

In addition, the present invention provides an electrode for a lithium secondary battery including an insulating layer formed of the above-described composition for forming an insulating layer for a lithium secondary battery.

The electrode for a lithium secondary battery may include an electrode current collector; an electrode active material layer formed on the electrode current collector; and an insulating layer formed on the electrode current collector and overlapping the electrode active material layer in a partial region. Here, a thickness of the insulating layer in the region overlapping the electrode active material layer is decreased more and more toward the electrode active material layer, and the insulating layer is formed of the above-described composition for forming an insulating layer for a lithium secondary battery.

The electrode for a lithium secondary battery includes an insulating layer formed of the above-described composition for forming an insulating layer for a lithium secondary battery, and the cohesive strength between the insulating layer and the electrode active material layer may be enhanced, and a sufficient insulating ability may be ensured. In addition, when a lithium secondary battery is produced by stacking a plurality of electrodes for a lithium secondary battery, a problem of reducing capacity or increasing resistance due to the short circuit of the battery may be prevented, and the quality and stability of the battery may be enhanced.

In addition, in the electrode for a lithium secondary battery, since the insulating layer formed of the above-described composition for forming an insulating layer for a lithium secondary battery has the above-described coloring agent and viscosity range, the erosion of the electrode active material layer in the overlapping region may be significantly prevented.

Hereinafter, the electrode for a lithium secondary battery according to the present invention will be described in detail.

The electrode for a lithium secondary battery includes an electrode current collector, an electrode active material layer and an insulating layer.

The electrode current collector is not particularly limited as long as it has high conductivity without causing a chemical change in a battery, and may be, for example, copper, stainless steel, aluminum, nickel, titanium, calcined carbon, copper or stainless steel whose surface is treated with carbon, nickel, titanium or silver, or an aluminum-cadmium alloy. In addition, the electrode current collector may generally have a thickness of 3 to 500 μm, and fine irregularities may be formed on the surface of the current collector, thereby reinforcing the binding strength with an electrode active material. For example, the electrode current collector may be used in various forms such as a film, a sheet, a foil, a net, a porous body, a foamed body, a non-woven fabric, etc.

The electrode active material layer is formed on the electrode current collector.

The electrode active material layer may include an electrode active material, and specifically, a positive electrode active material or a negative electrode active material. Preferably, the electrode active material includes a positive electrode active material.

The positive electrode active material is not particularly limited, and may be, for example, a generally used positive electrode active material. Specifically, the positive electrode active material may be a layered compound such as lithium cobalt oxide ($LiCoO_2$) or lithium nickel oxide ($LiNiO_2$) or a compound substituted with one or more transition metals; lithium iron oxide such as $LiFe_3O_4$; a lithium manganese oxide represented by $Li_{1+c1}Mn_{2-c1}O_4$ ($0 \leq c1 \leq 0.33$), such as $LiMnO_3$, $LiMn_2O_3$, or $LiMnO_2$; lithium copper oxide ($Li_2CuO_2$); a vanadium oxide such as $LiV_3O_8$, $V_2O_5$, or $Cu_2V_2O_7$; an Ni-site lithium nickel oxide represented by $LiNi_{1-c2}M_{c2}O_2$ (wherein M is at least any one selected from the group consisting of Co, Mn, Al, Cu, Fe, Mg, B and Ga, and $0.01 \leq c2 \leq 0.3$); a lithium manganese composite oxide represented by $LiMn_{2-c3}M_{c3}O_2$ (wherein M is at least any one selected from the group consisting of Co, Ni, Fe, Cr, Zn and Ta, and $0.01 \leq c3 \leq 0.1$) or $Li_2Mn_3MO_8$ (wherein M is at least any one selected from the group consisting of Fe, Co, Ni, Cu and Zn); or $LiMn_2O_4$ in which a part of Li of a formula is substituted with an alkaline earth metal ion, but the present invention is not limited thereto. The positive electrode may be a Li-metal.

The negative electrode active material is not particularly limited, and may be, for example, a compound enabling reversible intercalation and deintercalation of lithium. A specific example of the negative electrode active material may be a carbon-based material such as artificial graphite, natural graphite, graphitized carbon fiber or amorphous carbon; a metallic compound enabling alloying with lithium, such as Si, Al, Sn, Pb, Zn, Bi, In, Mg, Ga, Cd, a Si alloy, a Sn alloy or an Al alloy; a metal oxide capable of doping and undoping lithium such as $SiO_\beta$ ($0<\beta<2$), $SnO_2$, vanadium oxide, or lithium vanadium oxide; or a composite including the metallic compound and the carbon-based material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high temperature calcined carbon such as petroleum or coal tar pitch derived cokes.

The electrode active material may be included at 80 to 99.5 wt %, and preferably, 88 to 99 wt %, with respect to the total weight of the electrode active material layer.

The electrode active material layer may further include a binder for an electrode active material layer.

The binder for an electrode active material layer may serve to enhance the cohesion between electrode active materials and an adhesive strength between an electrode active material and an electrode current collector.

The binder for an electrode active material layer may be, specifically, at least one selected from the group consisting of polyvinylidene fluoride, polyvinyl alcohol, styrene butadiene rubber, polyethylene oxide, carboxyl methyl cellulose, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, polymethylmethacrylate, polybutylacrylate, polyacrylonitrile, polyvinylpyrrolidone, polyvinylacetate, polyethylene-co-vinyl acetate, polyarylate and a low molecular weight compound having a molecular weight of 10,000 g/mol or less, and most preferably, polyvinylidene fluoride in terms of adhesiveness, chemical resistance and electrochemical stability.

The binder for an electrode active material layer may be the same material as a binder polymer included in the above-described composition for forming an insulating layer for a lithium secondary battery. In this case, as will be described below, a binding strength in the overlapping region of an electrode active material layer and an insulating layer may be further enhanced, the enhancement of product safety and quality may be expected, and the binder for an electrode active material layer is preferable in terms of enhancement of an adhesive strength, a cohesive strength, and processability such as weldability.

The binder for an electrode active material layer may be included at 0.1 to 10 wt %, and preferably 0.5 to 5 wt %, with respect to the total weight of the electrode active material layer.

The electrode active material layer may further include a conductive material in addition to the above-described components. The conductive material is not particularly limited as long as it has conductivity without causing a chemical change in a battery, and for example, graphite such as natural graphite or artificial graphite; carbon black such as acetylene black, Ketjen black, channel black, furnace black, lamp black or thermal black; a conductive fiber such as a carbon fiber or a metal fiber; a conductive tube such as a carbon nanotube; a metal powder such as fluorocarbon powder, aluminum powder or nickel powder; a conductive whisker consisting of zinc oxide or potassium titanate; a conductive metal oxide such as titanium oxide; or a conductive polymer such as a polyphenylene derivative may be used.

The conductive material may be included at 0.1 to 20 wt %, and preferably 0.3 to 10 wt %, with respect to the total weight of the electrode active material layer.

The insulating layer is formed on an electrode current collector to overlap the electrode active material layer in a partial region. For example, the electrode active material layer and the insulating layer may be stacked or formed to overlap each other in a partial region.

The insulating layer may be formed of the above-described composition for forming an insulating layer for a lithium secondary battery. Accordingly, since the insulating layer has the high viscosity range, it is possible to significantly prevent the erosion of the electrode active material layer in the overlapping region, and realize excellent cohesive strength between the electrode active material layer and the electrode current collector. In addition, the electrode for a lithium secondary battery may have a low risk of an internal short circuit of the battery, and there may be a significant improvement in the increase in resistance or a reduction in capacity due to the short circuit.

Components and contents included in the insulating layer or the composition for forming an insulating layer for a lithium secondary battery have been described above.

In the region in which the electrode active material layer and the insulating layer overlap, the electrode active material layer may be formed obliquely.

A length of the region in which the electrode active material layer and the insulating layer overlap may be 0.05 to 1.3 mm, and preferably 0.1 to 1.0 mm. In this case, the reduction in capacity due to overlapping of the electrode active material layer and the insulating layer may be minimized, and preferably, the cohesive strength or adhesive strength between the electrode active material layer and the insulating layer is further enhanced.

To prevent the reduction in capacity due to the overlapping of the electrode active material layer and the insulating layer, the thickness of the insulating layer in the region overlapping the electrode active material layer may be reduced more and more toward the electrode active material layer.

In the region in which the electrode active material layer and the insulating layer overlap, when a thickness of the insulating layer at the end of the electrode active material layer is $A_0$, and a thickness of the insulating layer at the end of the insulating layer is A, $A/A_0$ may be 0.05 to less than 1, and preferably 0.1 to 0.7. When the thickness is in the above-mentioned range, the reduction in capacity due to the overlapping of the electrode active material layer and the insulating layer may be minimized, the cohesive strength or adhesive strength between the insulating layer and the electrode active material layer may be further enhanced, and interface breakage due to the erosion between the insulating layer and the active material layer may be prevented.

$A_0$ may be 3 to 20 μm, and preferably 5 to 12 μm, and A may be 0.15 μm to less than 20 μm, and preferably 1 to 5 μm.

In the electrode active material layer or the insulating layer in a region in which the electrode active material layer and insulating layer do not overlap, for example, the region excluding the overlapping region, a ratio ($d_2/d_1$) of the thickness ($d_2$) of the insulating layer with respect to the thickness ($d_1$) of the electrode active material layer may be 0.02 to 0.4, and preferably 0.05 to 0.1.

As the electrode for a lithium secondary battery has the above-described thickness ratio of the electrode active material layer and the insulating layer, an excellent insulating ability and excellent adhesive strength may be exhibited, and in the production of a lithium secondary battery through stacking a plurality of electrodes, a short circuit of an electrode tab may be prevented, and thus the reduction in capacity or the increase in resistance due to a short circuit may be prevented.

In the region in which the electrode active material layer and the insulating layer do not overlap, the thickness of the insulating layer may be 3 to 20 μm, and the thickness of the electrode active material layer may be 50 to 150 μm. Within the above ranges, the above-mentioned insulating ability, adhesiveness and processability may be more excellently realized.

The electrode for a lithium secondary battery may be a positive electrode for a lithium secondary battery or a negative electrode for a lithium secondary battery, and preferably a positive electrode for a lithium secondary battery.

The above-described electrode for a lithium secondary battery may include an insulating layer formed of the above-described composition for forming an insulating layer for a lithium secondary battery to enhance cohesive strength between the insulating layer and the electrode active material layer or electrode current collector, and have a sufficient insulating property. In addition, the erosion of the electrode active material layer in the overlapping region may be significantly prevented using the above-described composition for forming an insulating layer for a lithium secondary battery. In addition, when a lithium secondary battery is produced by stacking a plurality of electrodes for a lithium secondary battery, due to excellent weldability and process stability, a problem of reducing capacity or increasing resistance due to the short circuit of the battery may be prevented, and battery quality and stability may be enhanced.

Method of Preparing Electrode

In addition, the present invention provides a method of preparing an electrode for a lithium secondary battery using the above-described composition for forming an insulating layer for a lithium secondary battery.

The method of preparing an electrode for a lithium secondary battery includes forming an undried electrode active material layer by applying an active material slurry composition on an electrode current collector; forming an undried insulating layer by applying the above-described composition for forming an insulating layer for a lithium secondary battery so as to overlap the undried electrode active material layer in a partial region; and simultaneously drying the undried electrode active material layer and the undried insulating layer.

In the method of preparing an electrode for a lithium secondary battery, since the undried insulating layer or insulating layer is formed by applying the above-described composition for forming an insulating layer for a lithium secondary battery, exhibiting the cohesive strength with the electrode active material layer or the electrode current collector is excellent. In addition, since the above-described composition for forming an insulating layer for a lithium secondary battery has a high viscosity, the erosion of the electrode active material layer in the overlapping region with the electrode active material layer may be significantly prevented. Therefore, the electrode for a lithium secondary battery produced thereby may improve stability, and significantly improve a short circuit, an increase in resistance and a reduction in capacity due to an internal short circuit.

In addition, the method of preparing an electrode for a lithium secondary battery may use a wet-on-wet coating method. For example, according to the preparation method, the above-described electrode for a lithium secondary battery may be prepared by forming an undried electrode active material layer by applying an active material slurry composition on an electrode current collector but not drying the slurry composition, forming an undried insulating layer by applying the composition for forming an insulating layer to partially overlap the undried electrode active material layer, and simultaneously drying the undried electrode active material layer and the undried insulating layer. Therefore, the electrode active material layer and insulating layer, prepared as described above, may be adhered to each other with excellent cohesive strength, and the overlapping region is formed long, thereby enhancing cohesive strength, weldability and processability, and resultingly, the lithium secondary battery prepared as described above can be prevented in defects, and have excellent quality and stability.

Hereinafter, the method of preparing an electrode for a lithium secondary battery will be described in detail.

The method of preparing an electrode for a lithium secondary battery includes forming an undried electrode active material layer by applying an active material slurry composition on an electrode current collector.

The electrode current collector may be the same as the above-described electrode current collector in terms of a type, a material and a thickness thereof.

The active material slurry composition may be applied on the electrode current collector, thereby forming the undried electrode active material layer. For example, the undried electrode active material layer may be simultaneously dried with an undried insulating layer to be described below, thereby forming an electrode active material layer.

The active material slurry composition may be a positive electrode active material slurry composition or a negative electrode active material slurry composition, and preferably, a positive electrode active material slurry composition.

The positive electrode active material slurry composition may include a positive electrode active material, a binder and/or a conductive material, and the negative electrode active material slurry composition may include a negative electrode active material, a binder and/or a conductive material. The positive electrode active material, the negative electrode active material, the binder and/or the conductive material may be the above-described positive electrode active material, negative electrode active material, binder and/or conductive material.

The active material slurry composition may be applied on the electrode current collector, thereby forming an undried electrode active material layer. The "undried" used herein encompasses the case in which the active material slurry composition is applied and not yet dried, and the case in which the active material slurry composition is not substantially dried since a drying process has not been performed.

The method of preparing an electrode for a lithium secondary battery includes forming an undried insulating layer by applying the above-described composition for forming an insulating layer for a lithium secondary battery so as to overlap the undried electrode active material layer in a partial region.

The above-described composition for forming an insulating layer for a lithium secondary battery may be applied on the electrode current collector so as to overlap the undried electrode active material layer in a partial region, thereby forming an undried insulating layer. For example, the undried insulating layer may be simultaneously dried with the undried electrode active material layer to be described below, thereby forming the above-described insulating layer, and may form an overlapping region with the electrode active material layer.

Components and contents included in the insulating layer or the composition for forming an insulating layer for a lithium secondary battery have been described above.

The active material slurry composition may further include a binder for an electrode active material layer. Specific components of the binder for an electrode active material layer are the same as described above.

The binder for an electrode active material layer is preferably the same material as the binder polymer included in the above-described composition for forming an insulating layer for a lithium secondary battery. In this case, as to be described below, a binding strength in the region in which the electrode active material layer and the insulating layer overlap may be further enhanced, the enhancement of the stability and quality of a product may be expected, and thus the binder for an electrode active material layer is preferable in terms of enhancing adhesive strength, cohesive strength, and processability such as weldability.

The method of preparing an electrode for a lithium secondary battery includes simultaneously drying the undried electrode active material layer and the undried insulating layer.

In the method of preparing an electrode for a lithium secondary battery, rather than forming an electrode active material layer by applying and drying an active material slurry composition and then applying the composition for forming an insulating layer, the undried electrode active material layer and the undried insulating layer are simultaneously dried, thereby further enhancing the cohesive strength or adhesive strength between an electrode active material layer and an insulating layer. In addition, for this reason, an overlapping region of the undried electrode active material layer and the undried insulating layer or an overlapping region of the electrode active material layer and the insulating layer becomes relatively longer, and a thickness of the insulating layer in the overlapping region may be smaller, thereby significantly enhancing processability, weldability, and the quality and stability of a battery.

In addition, the method of preparing an electrode for a lithium secondary battery uses the above-described composition for forming an insulating layer for a lithium secondary battery, thereby significantly preventing the erosion of the electrode active material layer in the overlapping region.

The drying process has no particular limitation, as long as the undried electrode active material layer and the undried insulating layer may be sufficiently dried, and a drying method conventionally known in the art may be used. For example, a drying method selected from a convection method, a direct heating method, and an induction heating method may be applied, and specifically, performed at 50 to 180° C. for 1 to 5 minutes.

The difference in viscosity between the active material slurry composition and the composition for forming an insulating layer may be 5,000 cP or less at 25° C., preferably, 2,000 cP or less, and more preferably, 1,000 cP or less. Since the difference in viscosity between the active material slurry composition and the composition for forming an insulating layer is controlled within the above-described range, after the undried electrode active material layer and the undried insulating layer are dried, the adhesive strength or cohesive strength between them may be further enhanced, and the erosion in the overlapping region is effectively prevented. The viscosity of the composition for forming an insulating layer may be 1,000 to 10,000 cP, and preferably 5,000 to 8,000 cP at 25° C. Within the above range, the cohesive strength with the undried electrode active material layer or the electrode active material layer may be further enhanced.

The viscosity of the active material slurry composition may be 5,000 to 15,000 cP, and preferably 5,000 to 13,000 cP at 25° C., and within the above range, the cohesive strength of the undried electrode active material layer or electrode active material layer may be enhanced, and thus the coatability and processability may be further enhanced.

The above viscosity range may be achieved by suitably controlling components and solid contents of the active material slurry composition or the composition for forming an insulating layer.

Secondary Battery

In addition, the present invention provides a lithium secondary battery including the above-described electrode for a lithium secondary battery.

The lithium secondary battery specifically includes a positive electrode, a negative electrode located to face the positive electrode, a separator interposed between the positive electrode and the negative electrode, and an electrolyte. Here, as the positive electrode and/or the negative electrode, the above-described electrode(s) for a lithium secondary battery may be used. In addition, the lithium secondary battery may selectively include a battery case accommodating an electrode assembly including the positive electrode, the negative electrode and the separator, and a sealing member for sealing the battery case.

Meanwhile, in the lithium secondary battery, a separator is not particularly limited as long as it is generally used in a lithium secondary battery to separate a negative electrode from a positive electrode and provide a moving path for lithium ions, and particularly, the separator has a low resistance to ion mobility of an electrolyte and an excellent electrolyte impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a melt-type inorganic electrolyte, which can be used in production of a lithium secondary battery, but the present invention is not limited thereto.

Specifically, the electrolyte may include an organic solvent and a lithium salt. The organic solvent is not particularly limited as long as it can serve as a medium enabling the mobility of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate having high ion conductivity and high permittivity to increase the charge/discharge performance of a battery (for example, ethylene carbonate or propylene carbonate) and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to about 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance a lifespan characteristic of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

The lithium secondary batteries according to examples are useful in portable devices such as a mobile phone, a notebook computer and a digital camera and in the field of electric automobiles such as a hybrid electric vehicle (HEV).

Therefore, according to another exemplary embodiment of the present invention, a battery module including the lithium secondary battery as a unit cell, and a battery pack including the same are provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

The shape of the lithium secondary battery according to the present invention is not particularly limited, but may be a cylindrical shape using a can, a prismatic shape, a pouch shape, or a coin shape.

The lithium secondary battery according to the present invention may not only be used in a battery cell used as a power source of a small device, but also may be preferably used as a unit battery in middle-to-large battery modules including a plurality of battery cells.

Hereinafter, embodiments of the present invention will be described in detail with reference to the accompanying drawings so that those of ordinary skill in the art can easily carry out the present invention. However, the present invention may be implemented in a variety of different forms, and is not limited to the embodiments described herein.

EXAMPLES AND COMPARATIVE EXAMPLES

Example 1

Preparation of Composition for Forming Insulating Layer for Lithium Secondary Battery A composition for forming an insulating layer was prepared by dissolving 9 parts by weight of polyvinylidene fluoride (trade name: KF9700, manufacturer: Kureha, weight average molecular weight: 880,000) as a binder polymer and 0.1 part by weight of a benzylidene-based organic dye, Yellow 081 (manufactured by BASF) as a coloring agent in 100 parts by weight of methylpyrrolidone (NMP). Here, the viscosity of the composition for forming an insulating layer was 6,000 cP.

Example 2

Preparation of Composition for Forming Insulating Layer for Lithium Secondary Battery A composition for forming an insulating layer was prepared by dissolving 9 parts by weight of polyvinylidene fluoride (trade name: KF9700, manufacturer: Kureha, weight average molecular weight: 880,000) as a binder polymer and 0.1 part by weight of an azo-based organic dye, Red 395 (manufactured by BASF) as a coloring agent in 100 parts by weight of NMP. Here, the viscosity of the composition for forming an insulating layer was 6,000 cP.

Example 3

Preparation of Composition for Forming Insulating Layer for Lithium Secondary Battery A composition for forming an insulating layer was prepared by dissolving 10.5 parts by weight of polyvinylidene fluoride (trade name: KF9700, manufacturer: Kureha, weight average molecular weight: 880,000) as a binder polymer and 0.1 part by weight of a benzylidene-based organic dye, Yellow 081 (manufactured by BASF) as a coloring agent in 100 parts by weight of NMP. Here, the viscosity of the composition for forming an insulating layer was 12,000 cP.

Comparative Example 1

Preparation of Composition for Forming Insulating Layer for Lithium Secondary Battery A composition for forming an insulating layer was prepared by dissolving 12 parts by weight of polyvinylidene fluoride (trade name: KF1100, manufacturer: Kureha, weight average molecular weight: 280,000) as a binder polymer and 0.1 part by weight of a benzylidene-based organic dye, Yellow 081 (manufactured by BASF) as a coloring agent in 100 parts by weight of NMP. Here, the viscosity of the composition for forming an insulating layer was 670 cP.

Comparative Example 2

Preparation of Composition for Forming Insulating Layer for Lithium Secondary Battery A composition for forming an insulating layer was prepared by dissolving 6 parts by weight of polyvinylidene fluoride (trade name: KF9700, manufacturer: Kureha, weight average molecular weight: 880,000) as a binder polymer, 0.08 part by weight of a pigment (trade name: Yellow 139, manufacturer: BASF) as a coloring agent and 1.5 parts by weight of CR-V (manufacturer: Shin-Etsu Chemical) as a dispersing agent in 100 parts by weight of NMP. Here, the viscosity of the composition for forming an insulating layer was 1,000 cP.

EXPERIMENTAL EXAMPLES

Experimental Example 1

Evaluation by Scanning Electron Microscope (SEM) Observation

A positive electrode for a lithium secondary battery was prepared by using each of the compositions for forming an insulating layer prepared by Example 1 and Comparative Example 1.

Specifically, a positive electrode active material slurry composition having a viscosity of 8,000 cP at 25° C. was prepared by mixing $LiNi_{0.6}Mn_{0.2}Co_{0.2}O_2$ as a positive electrode active material, carbon black as a conductive material, and polyvinylidene fluoride (PVdF) as a binder for an electrode active material layer in a weight ratio of 97.3:1.5:1.2, and adding the mixture to an NMP solvent so that a solid content became 69 wt %.

Afterward, an undried positive electrode active material layer was formed by applying the positive electrode active material slurry composition on an aluminum current collector, and an undried insulating layer was formed by applying the composition for forming an insulating layer on the aluminum current collector so as to overlap the undried positive electrode active material layer in a partial region.

Afterward, a positive electrode for a lithium secondary battery was prepared by forming a positive electrode active material layer and an insulating layer by simultaneously drying the undried positive electrode active material layer and the undried insulating layer at 160° C. (for about 3 minutes), respectively, and rolling the formed positive electrode active material layer and insulating layer.

Figure 2:
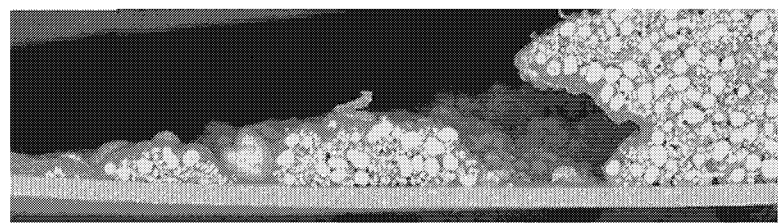
FIG. 2 is an SEM image showing the overlapping region of an insulating layer and a positive electrode active material layer in the cross-section of a positive electrode prepared in Comparative Example 1.

Subsequently, a cross-section of the overlapping region of the positive electrode active material layer and the insulating layer in the cross-section of the positive electrode was observed by a SEM. The SEM image of Example 1 is shown in FIG. 1, and the SEM image of Comparative Example 1 is shown in FIG. 2. Referring to FIGS. 1 and 2, it can be seen that, in the positive electrode of Example 1, the overlapping region of the insulating layer and the electrode active material layer was formed with an excellent cohesive strength, and erosion did not occur. However, it can be seen that, it was difficult to apply the positive electrode of Comparative Example 1 to a product due to erosion occurring in the overlapping region of the insulating layer and the electrode active material layer.

Experimental Example 2

Evaluation of Electrolyte Elution

An aluminum foil was coated with the compositions for forming an insulating layer of Examples 1 and 2 and cut into a size of 5 cm×5 cm, and then the cut foil was immersed in a non-aqueous electrolyte solvent prepared by dissolving 1.0 mol of $LiPF_6$ and mixing ethylene carbonate (EC) and ethyl methyl carbonate (EMC) in a volume ratio of 3:7 at room temperature for 18 hours, so as to perform a test to confirm whether a coloring agent was eluted into the electrolyte solution. After the test, the result of Example 1 is shown in FIG. 3, and the result of Example 2 is shown in FIG. 4.

Figure 3:
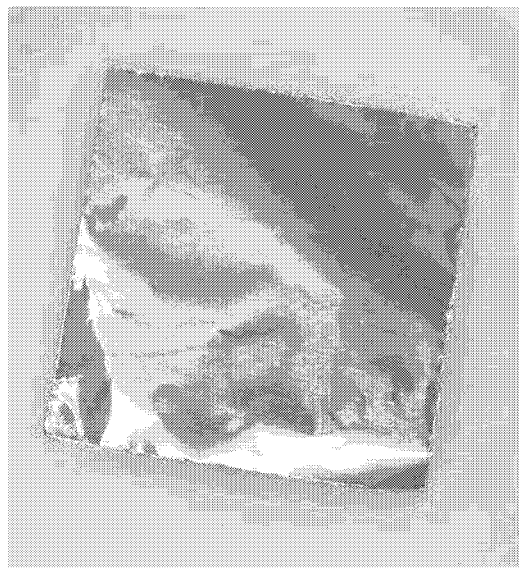
FIG. 3 shows the result of an experiment of evaluating electrolyte elution for the positive electrode prepared in Example 1.
Figure 4:
FIG. 4 shows the result of an experiment of evaluating electrolyte elution for the positive electrode prepared in Example 2.

Referring to FIGS. 3 and 4, it was confirmed that, in the case of the composition for forming an insulating layer of Example 1, a phenomenon of a coloring agent staining or eluting into the electrolyte solution did not occur, but in the case of the composition for forming an insulating layer of Example 2 using a coloring agent, it was seen that that a coloring agent was slightly eluted into the electrolyte solution.

Experimental Example 3

Evaluation of Liquid Stability

The compositions for forming an insulating layer according to Example 1 and Comparative Example 2 were stored at room temperature (25° C.) for 31 days so as to evaluate the liquid stability of the compositions. The observation result of Example 1 is shown in FIG. 5, and the observation result of Comparative Example 1 is shown in FIG. 6.

Figure 5:
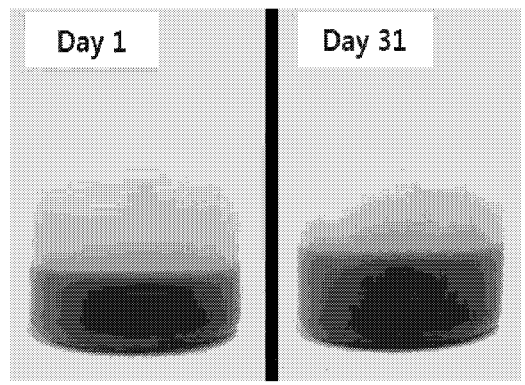
FIG. 5 is an image for confirming liquid stability for a composition for forming an insulating layer of Example 1.
Figure 6:
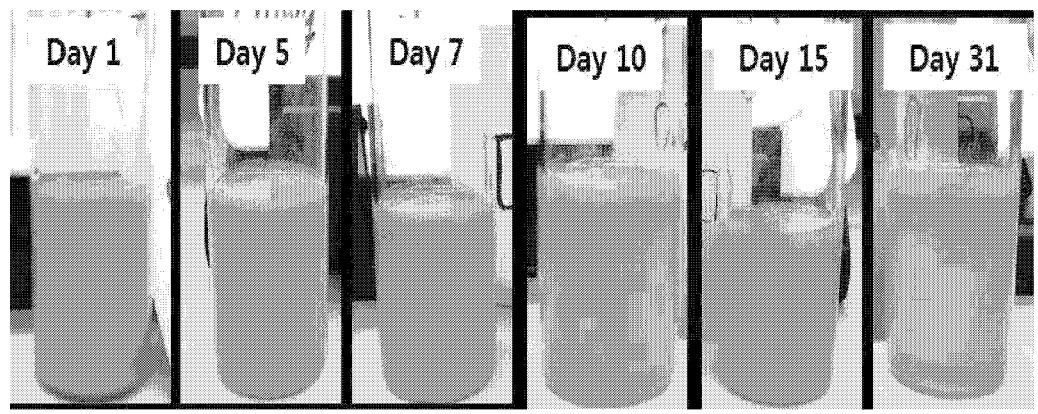
FIG. 6 is an image for confirming liquid stability for a composition for forming an insulating layer of Comparative Example 2.

Referring to FIGS. 5 and 6, it can be confirmed that the composition for forming an insulating layer of Example 1 did not show phase separation even 31 days after storage, thereby exhibiting excellent liquid stability, but the composition for forming an insulating layer of Comparative Example 2 showed phase separation over time, thereby exhibiting deteriorated stability.

Experimental Example 4

Evaluation of Coatability

An insulating layer was formed by coating an aluminum foil with each of the compositions for forming an insulating layer of Examples 1 and 3 to a width of 3.8 mm and drying the coated foil so as to observe the appearance of the insulating layer using a surface inspection apparatus (manufactured by ANSYS). The surface inspection image of Example 1 is shown in FIG. 7, and the surface inspection image of Example 3 is shown in FIG. 8.

Figure 7:
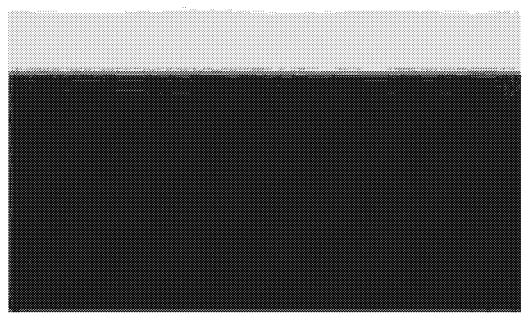
FIG. 7 is a surface inspection image for evaluating the coatability of the composition for forming an insulating layer of Example 1.
Figure 8:
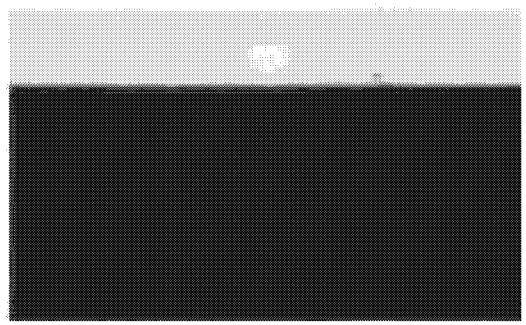
FIG. 8 is a surface inspection image for evaluating the coatability of the composition for forming an insulating layer of Example 3.

Referring to FIGS. 7 and 8, it was evaluated that the compositions for forming an insulating layer of Examples 1 and 3 generally exhibited excellent coatability due to high viscosity levels. However, the insulating layer was formed without bubbles in Example 1, whereas bubbles were somewhat found in the insulating layer in Example 3 due to a slightly high viscosity of the composition.

Experimental Example 5

Evaluation of Coatability

Figure 9:
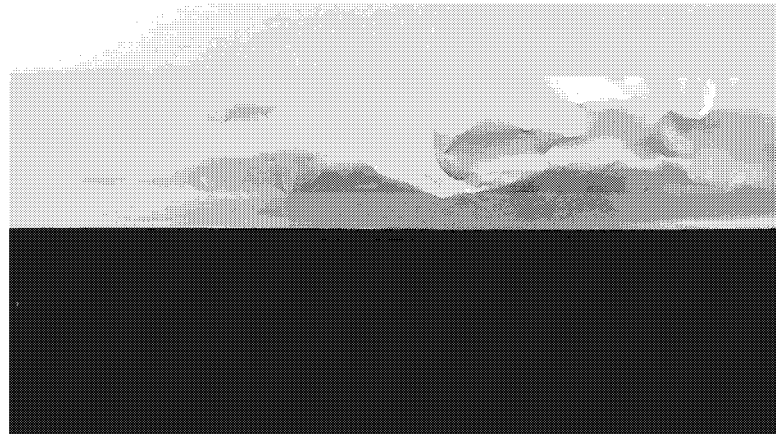
FIG. 9 is an optical microscope image for evaluating the coatability of the composition for forming an insulating layer of Example 1.
Figure 10:
FIG. 10 is an optical microscope image for evaluating the coatability of the composition for forming an insulating layer of Example 3.

An insulating layer was formed by coating an aluminum foil with each of the compositions for forming an insulating layer of Examples 1 and 3 to a width of 3.8 mm and drying the coated foil so as to observe the appearance of the insulating layer using an optical microscope. The optical microscope image of Example 1 is shown in FIG. 9, and the optical microscope image of Example 3 is shown in FIG. 10. In FIGS. 9 and 10, the yellow part represents the part coated with the composition for forming an insulating layer.

Referring to FIGS. 9 and 10, the compositions for forming an insulating layer of Examples 1 and 3 were generally evaluated as having excellent coatability due to excellent viscosity levels.

While it can be confirmed that, in Example 1, the composition for forming an insulating layer had a uniform coated width, in Example 3, the uniformity of the coated width was slightly decreased due to a slightly high viscosity, and the aluminum foil was exposed due to the formation of a wave shape. Compared with the coated area of Example 1, the area of the aluminum foil exposed by the wave shape in Example 3 was calculated to be about 30%, confirming that, compared with Example 1, Example 3 showed a slightly decrease in coatability.

The invention claimed is:

1. A composition for forming an insulating layer for a lithium secondary battery, comprising:
    a binder polymer;
    a coloring agent including at least one selected from the group consisting oft an organic dye, an oil-soluble dye and an organic phosphor; and
    a solvent,
    wherein the binder polymer is at least one selected from the group consisting of polyvinylidene fluoride, polyvinyl alcohol, styrene butadiene rubber, polyethylene oxide, carboxyl methyl cellulose, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, polymethylmethacrylate, polybutylacrylate, polyacrylonitrile, polyvinylpyrrolidone, polyvinylacetate, polyethylene-co-vinyl acetate and polyarylate, and
    wherein the composition has a viscosity of 1,000 cP or more at 25° C.

2. The composition according to claim 1, wherein the viscosity is 1,000 to 10,000 cP at 25° C.

3. The composition according to claim 1, wherein the solubility of the coloring agent in the solvent is 300 to 500 g/L at 25° C.

4. The composition according to claim 1, wherein the coloring agent is contained at 0.01 to 10 parts by weight with respect to the 100 parts by weight of the solvent.

5. The composition according to claim 1, wherein the coloring agent further comprises a metal ion, the metal ion forming a complex salt structure with at least one selected from the group consisting of the organic dye, the oil-soluble dye and the organic phosphor.

6. The composition according to claim 5, wherein the metal ion is an ion of at least one metal selected from the group consisting of copper, cobalt, chromium, nickel and iron.

7. The composition according to claim 1, wherein the binder polymer is contained at 5 to 15 parts by weight with respect to 100 parts by weight of the solvent.

8. The composition according to claim 1, wherein a solid content of the composition for forming an insulating layer for a lithium secondary battery is 5 to 15 wt %.

9. An electrode for the lithium secondary battery, comprising:
    an electrode current collector;
    an electrode active material layer formed on the electrode current collector; and
    an insulating layer formed on the electrode current collector and overlapping the electrode active material layer in a partial region,
    wherein the insulating layer is formed of the composition for forming an insulating layer for a lithium secondary battery according to claim 1.

10. A lithium secondary battery comprising the electrode for a lithium secondary battery according to claim 9.

11. A method of preparing an electrode for a lithium secondary battery, comprising:
    forming an undried electrode active material layer by applying an active material slurry composition on an electrode current collector;
    forming an undried insulating layer by applying the composition for forming an insulating layer for a lithium secondary battery according to claim 1 so as to overlap the undried electrode active material layer in a partial region; and
    simultaneously drying the undried electrode active material layer and the undried insulating layer.

12. The method according to claim 11, wherein a difference in viscosity between the active material slurry composition and the composition for forming an insulating layer is 5,000 cP or less at 25° C.

13. The method according to claim 12, wherein a viscosity of the active material slurry composition is 5,000 to 15,000 cP at 25° C.

14. The method according to claim 11, wherein the active material slurry composition comprises the same polymer material as the binder polymer.

* * * * *